United States Patent [19]

Jacobson

[11] 3,962,025

[45] June 8, 1976

[54] CORRUGATOR LINER BONDING DEVICE

[76] Inventor: Donald E. Jacobson, 14839 Wheatstone Ave., Norwalk, Calif. 90650

[22] Filed: Mar. 27, 1975

[21] Appl. No.: 562,459

[52] U.S. Cl. .................................. 156/546; 156/578; 118/230; 118/249

[51] Int. Cl.² .................. B32B 31/04; B65C 11/04; B05C 1/00

[58] Field of Search ........... 156/543, 544, 546, 578; 118/211, 230, 249, 250

[56] References Cited

UNITED STATES PATENTS 2,203,250 6/1940 Bolhofner et al. .................. 118/249

2,440,481 4/1948 Lowery .............................. 118/249

*Primary Examiner*—Douglas J. Drummond

*Attorney, Agent, or Firm*—William C. Babcock

[57] ABSTRACT

A device capable of being removably mounted on a corrugator to glue overlapping marginal edge portions of first and second liners together to obtain a liner of greater width and of commercial value when the first and second liners are so narrow in width that in the past they would have been discarded as scrap. The bonded first and second liners may be used subsequently on the corrugator to form corrugated board that is of substantially the same strength and durability as though the bonded first and second liners were a single sheet.

5 Claims, 6 Drawing Figures

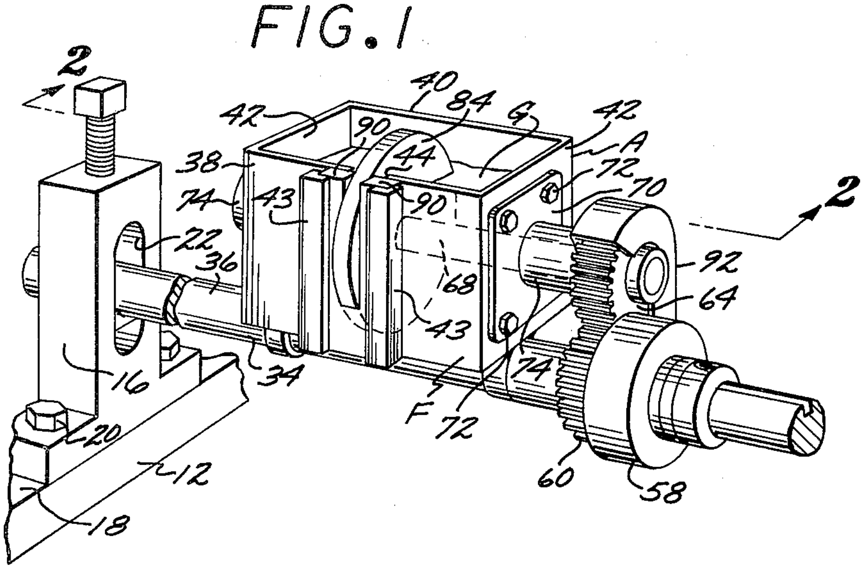
FIG. 1
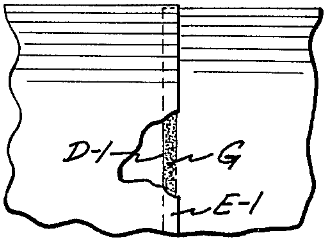
FIG. 4
FIG. 2
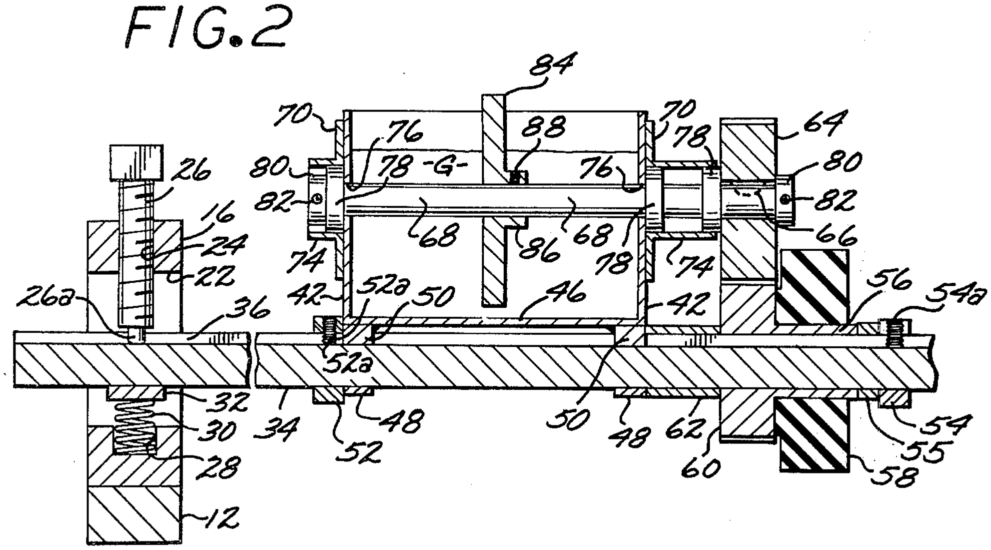
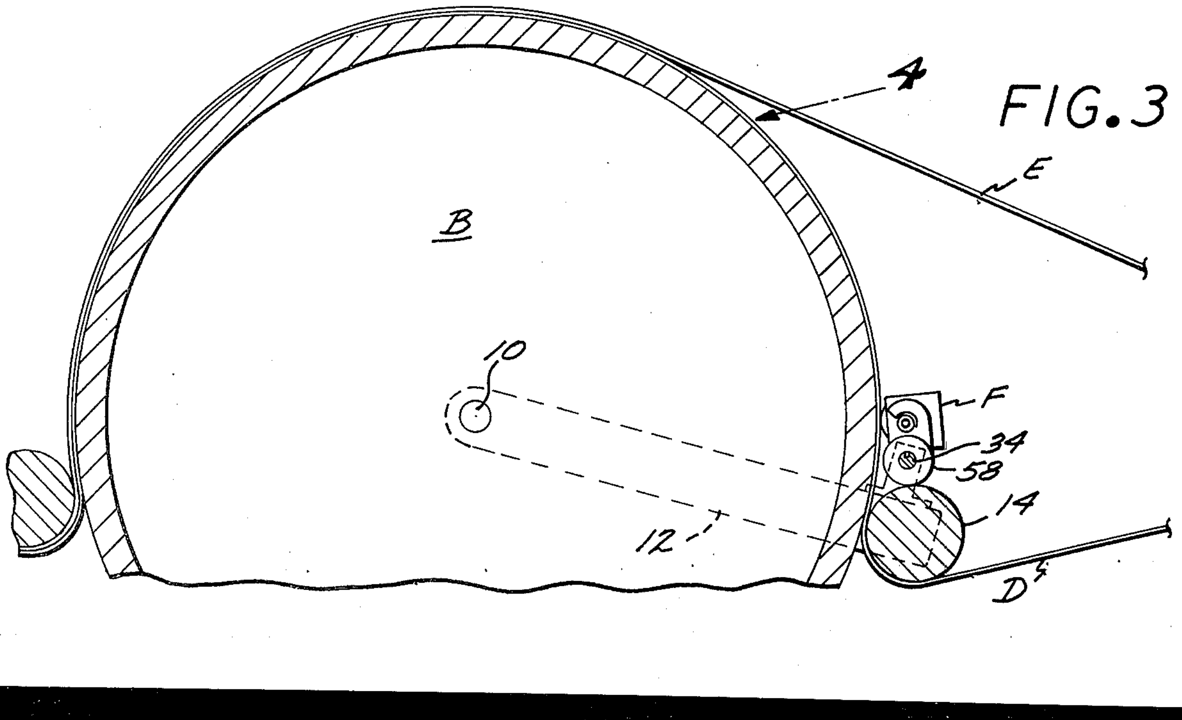
FIG. 3

CORRUGATOR LINER BONDING DEVICE

BACKGROUND OF THE INVENTION

1. Field of the Invention

A corrugator liner bonding device.

2. Description of the Prior Art

In the corrugated board industry, liners are cut or slit to provide corrugated board of a width desired by a customer. The portion of the liner not used in the production of the corrugated board is in many instances so narrow in width as to have no commercial value, and is discarded as scrap.

The primary purpose of the present invention is to provide a device that may be removably mounted on a corrugator to permit first and second liners of relatively narrow width and no commercial value to be bonded together on overlapping marginal edge portions thereof to provide a liner of a width as to have commercial value and one that may be used in the production of corrugated board.

A further object of the invention is to supply a corrugator liner bonding device that has a simple mechanical structure, may be removably mounted on a pair of arms that support An idler roller adjacent a preheater roll, and the device automatically applying a film of glue to a marginal edge portion of the first liner prior to a marginal edge portion of a second liner being brought into physical contact therewith, and the overlapping marginal edge portions when bonded together cooperating to provide a liner of a width that has commercial value and may be used in forming corrugated board that will have substantially the same strength and durability as though the bonded first and second liners were a single sheet of liner.

SUMMARY OF THE INVENTION

A corrugator liner bonding device that is used in conjunction with a corrugator that has a preheater roll rotatably supported by a first shaft, a pair of arms pivotally supported on opposite ends of the roll from the first shaft, and an elongate idler roller rotatably supported between the arms. A first liner extends under the idler roller and then upwardly on the preheater roll. A second liner engages the preheater roll adjacent the top thereof. The first and second liners are so laterally spaced that a first marginal edge portion of the first liner is overlapped by a second marginal edge portion of the second liner prior to the first and second liners moving out of contact with the preheater roll.

The present invention includes a second shaft removably supported in a non-rotatable position between the arms, and disposed above the first shaft and parallel thereto. The second shaft supports a glue reservoir in a fixed position thereon, with the glue reservoir having an applicator wheel rotatably supported therein that engages the glue. The wheel has a portion thereof extending through a downwardly extending slot formed in one side piece of the reservoir. The wheel is of substantially the same width as the first marginal edge portion of the first liner and is in alignment therewith.

The invention also includes a resilient wheel that is in pressure frictional contact with the idler roller and is driven as a result thereof. Rotational movement transmitting means are provided as a part of the invention that transmit rotation of the resilient wheel to the applicator wheel in the container, and as a result as the idler roller rotates the applicator wheel is driven to apply a film of glue to the first marginal edge-portion of the first liner. Subsequently this glue covered first marginal edge portion is brought into physical contact with the second marginal edge portion of the second liner, with the first and second liners then being bonded together to provide a liner of such width that it may be used commercially to form corrugated board that is of substantially the same strength and durability as though the first and second bonded liners were formed from a single sheet of liner material.

BRIEF DESCRIPTION OF THE DRAWINGS

FIG. 1 is a perspective view of a first form of the glue applying invention;

FIG. 2 is a longitudinal cross-sectional view of the first form of the invention taken on the line 2—2 of FIG. 1;

FIG. 3 is a transverse cross-sectional view of a preheater roll of a corrugator and an idler roller, and illustrating the manner in which the invention applies a film of glue to a first marginal edge portion of a first liner prior to a second marginal edge portion of a second liner being brought into pressure contact therewith;

FIG. 4 is a fragmentary, vertical cross sectional view of the preheater roll and first and second liners as the same are brought into pressure contact with one another;

DESCRIPTION OF THE PREFERRED EMBODIMENTS

Figure 5:
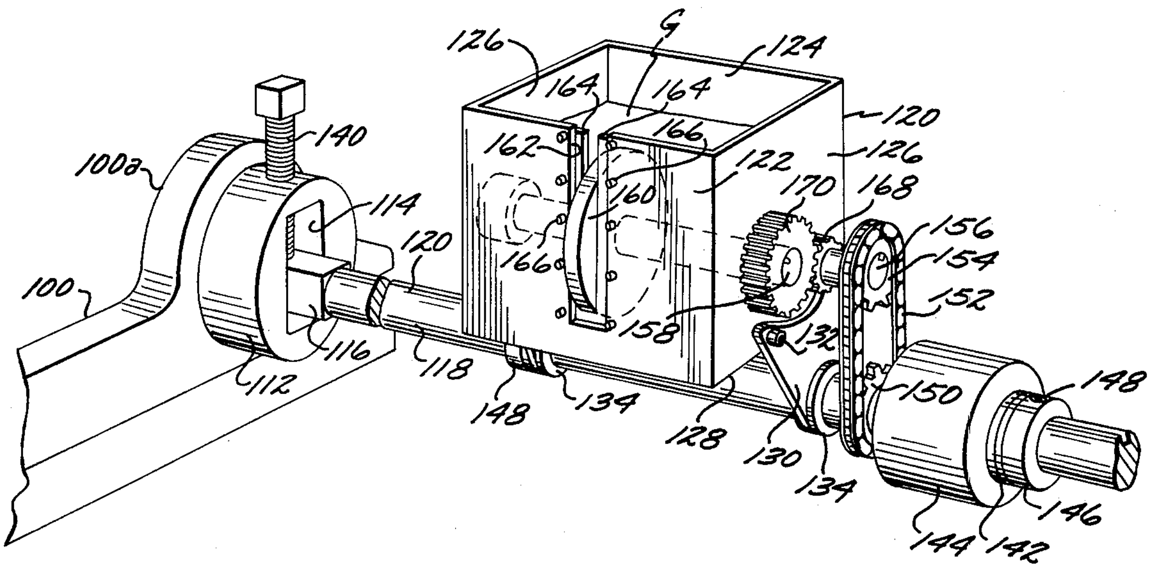
FIG. 5 is a perspective view of a second form of the glue applying device.

In FIG. 1 a first form of the glue applying device A is shown that is used in conjunction with a corrugator (not shown) that includes a preheater roll B, The preheater roll B is shown in FIG. 3, and is rotatably supported on a first shaft 10. The shaft 10 at each end of the roll B pivotally supports an arm 12, with the pair of arms 12 rotatably supporting an idler roller 14 therebetween. Due to the weight thereof, the idler roller B at all times tends to pivot the arms 12 in a clockwise direction as viewed in FIG. 3.

First and second liners D and E are provided that are sufficiently narrow in width that they would, prior to the present invention, be discarded as scrap and have no commercial value. The first liner D, as shown in FIG. 3, extends under the idler roller 14 and upwardly on the exterior surface of the preheater roller B. The second liner E is so laterally spaced relative to the first liner D that a first marginal edge portion D-1 of the first liner has a second marginal edge portion E-1 of the second liner overlying the same. Prior to the first and second liner D and E moving out of engagement with the preheater roll B, the marginal edge portion D-1 and E-1 pressure contact one another.

Each of the arms 12 has a support 16 secured to the upper surface portion 18 by bolts 20 or other suitable removable fastening means. Each support 16 has an elongate, vertically extending opening 22 formed therein, which opening is in communication with a tapped bore 24 defined in the upper portion of the support. Each tapped bore 24 is engaged by a bolt 26 that extends downwardly into the opening 22. The lower portion of each support 16 has a recess 28 formed therein in which a lower portion of a compressed helical spring 30 is supported. Each spring 30 on the upper end thereof has a rigid pad 32 mounted thereon, which pad is vertically movable in the opening 22. Each pad 32 supports an end portion of a second shaft 34 that has a longitudinal spline 36 formed therein. The second shaft 34 is held in a non-rotatable position between supports 16 due to engagement of the spline by a pin 26*a* that extends downwardly from each bolt 26. When the bolts 26 are rotated in opposite directions, the springs 30 may be caused to expand and contract, with the springs and pads 32 cooperatively raising or lowering the second shaft 34 to a desired spaced relationship with the idler roller 14.

A glue reservoir F is provided as shown in FIGS. 1 and 2, that is generally rectangular and defined by first and second side pieces 38 and 40 and a pair of end pieces 42. The reservoir is open at the top. The first side piece 38 has a slot 44 extending downwardly from the upper edge portion to terminate a substantial distance above the bottom 46 of the reservoir F. Two parallel, laterally spaced, vertical members 43 of channel shape transverse cross section are secured to first side piece 38 on opposite sides of slot 44, the purpose of which members will later be explained.

The reservoir F, as can be seen in FIG. 2 has two axially aligned rings 48 secured to the bottom 46, which rings include lugs 50 that slidably engage spline 36. First and second collars 52 and 54 are mounted on the second shaft 34 and secured in desired longitudinal positions thereon by set screws 52*a* and 54*a*. The set screws 52*a* and 54*a* when tightened, frictionally engage the second shaft 34 and extend downwardly into the spline 36 therein as shown in FIG. 2.

A sleeve 56 is rotatably supported on the second shaft 34 to the right of the reservoir F, as viewed in FIG. 2, with the sleeve having a resilient wheel 58 bonded to the exterior surface thereof and the left hand end of the sleeve as shown in FIG. 2 having a first gear 60 secured thereto. A tubular spacer 62 is mounted on the second shaft 34 and extends between the right hand end of one of the rings 48 as illustrated in FIG. 2, and the left hand side of the first gear 60. The first gear 60 is in toothed engagement with a second gear 64 that by a key 66 is secured to the right hand end portion of a third shaft 68.

Two plates 70 are secured by bolts 72 or the like to end pieces 42, with the plates having cylindrical bosses 74 extending outwardly therefrom in opposite directions as shown in FIG. 2. Bosses 74 are axially aligned with openings 76 in the end pieces 42. The bosses 74 have bearing assemblies 78 therein that rotatably support third shaft 68. Collars 80 are mounted on the end portions of third shaft 68 to prevent it moving longitudinally relative to glue reservoir F. The collars 80 are removably held on third shaft 68 by set screws 82. A glue applicator wheel 84 having a hub 86 is mounted on third shaft 68 in alignment with slot 44. The applicator wheel 84 is removably held in a non-rotatable position relative to third shaft 68 by a set screw 88.

Applicator wheel 84 is of sufficient diameter as to have a portion thereof project forwardly through slot 44 as shown in FIG. 1. Two resilient blocks 90 are held in sealing contact by members 43 shown in FIG. 1 with the sides of the projecting applicator wheel portion and the portions of first side piece 38 adjacent slot 40 to prevent glue G in the receptacle escaping therefrom by flowing through the slot. The right hand positioned boss 74 as viewed in FIG. 2 supports a shield 92 that extends over the first and second gears 60 and 64. A spacer 55 is mounted on second shaft 34 and situated between gear 58 and the right hand collar 54 as shown in FIG. 2.

In the operation of the first form A of the invention the bolts 26 are rotated to move second shaft 34 and resilient wheel 58 relative to idler roller 14 to a position where the resilient wheel is in pressure frictional contact with the roller. The applicator wheel 84 is of substantially the same width as the width of the first marginal edge portion E-1. Applicator wheel 84 is in light pressure contact with the first marginal edge portion E-1. As the preheater roll B rotates the first and second liners D and E move thereover, with the movement of the first liner causing rotation of idler roller 14. The idler roller 14 as it rotates drives resilient wheel 58, and rotation of the resilient wheel causing rotation of the applicator wheel 84 in a direction opposite to that in which the first liner D is traveling.

The applicator wheel as it rotates has the peripheral edge surface 84*a* thereof covered with a film of glue G, which film of glue is transferred to the first marginal edge portion D-1 of first liner D.

Subsequently, the second marginal edge portion E-1 of second liner E is brought into pressure contact with the glue covered first marginal edge portion D-1, and the first and second liners D and E are bonded together. The first and second liners when bonded together have substantially the same strength and durability as a liner formed from a single sheet. The glue G may be a starch gel.

Figure 6:
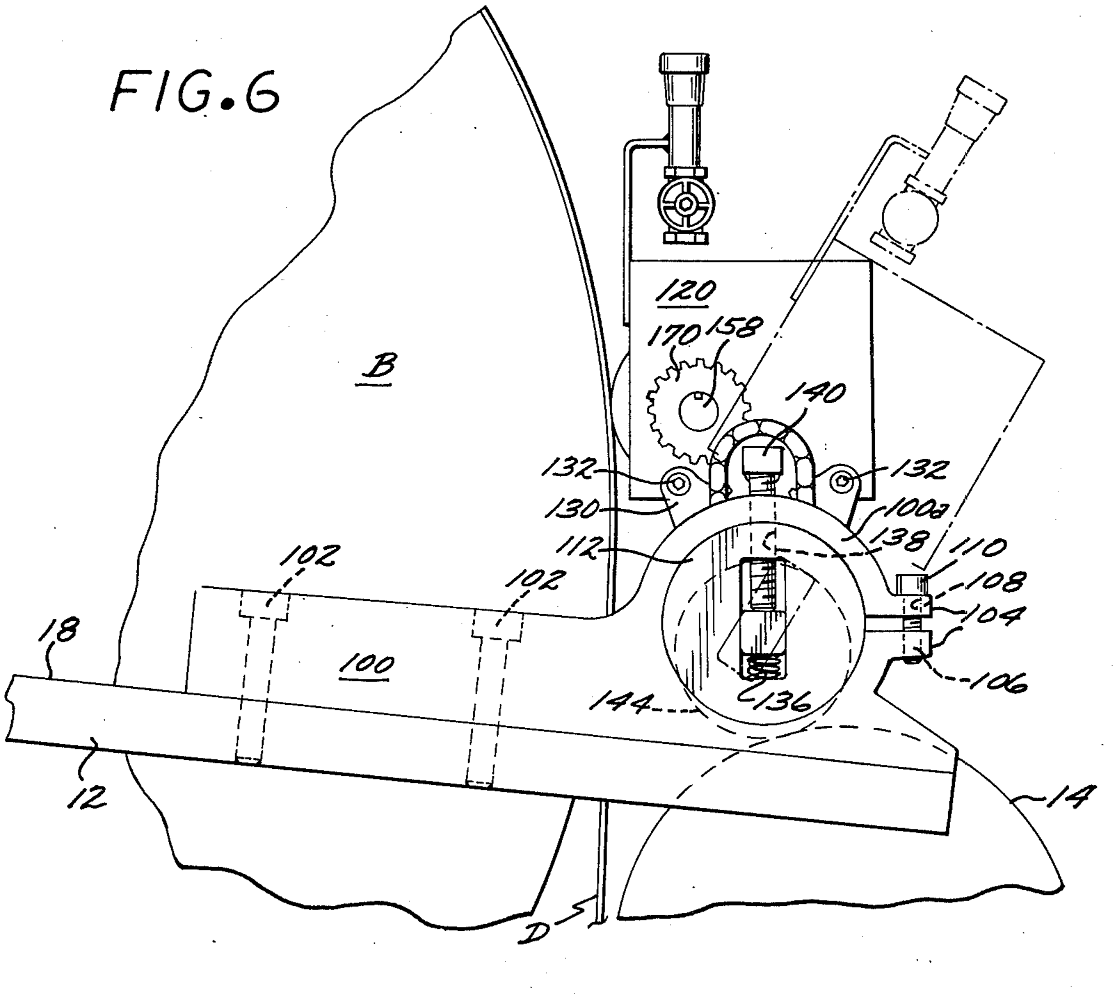
FIG. 6 is an end elevational view of the second form of the device supported from the arms that rotatably support an idler roller therebetween.

A second form H of the invention is shown in FIGS. 5 and 6 that may be removably mounted on the pair of arms 12 and serves the same function as the first form A. The second form H of the invention has the operational advantage that it is more versatile as to installation than the first form relative to having the resilient wheel adjusted into frictional contact with idler roller 14 and the glue applicator wheel in light contact with the first marginal edge.

The first form H of the invention includes a pair of elongate supports 100 that are secured to the upper surfaces 18 of the pair of arms 12 by bolts 102 or other suitable fastening means. Each support 100 has a split generally circular end portion 100*a* that has a pair of lugs projecting from free end portions thereof. The lower most one of the lugs 104 as viewed in FIG. 6 has a tapped bore 106 therein that is axially aligned with a bore 108 formed in the upper lug 104. Each support has a bolt 110 extending downwardly through bore 108 to engage tapped bore 106.

Each of the circular end portions 100*a* rotatably supports a rigid cylindrical body 112 that may be held in a desired fixed position therein by rotating the bolt 110 to move lugs 104 towards one another. Each body 112 has an elongate opening 114 therein of square or rectangular transverse cross section.

The pair of openings 114 slidably support end portions 116 of a second shaft 118. The end portions 116 are of square or transverse cross section. The portion of second shaft 118 between the end portions 116 is of circular transverse cross section and has a longitudinal spline 120 therein.

A reservoir 120 is provided for holding glue G. The reservoir is defined by forward and rearward side pieces 122 and 124 and a pair of end pieces 126. Reservoir G includes a bottom 128. A pair of identical brackets are secured to end pieces 126 by bolts 132 or other suitable fastening means. Each bracket 130 includes a lower ring shaped portion 134 that includes a lug (not shown) that slidably engages spline 120 to prevent rotation of reservoir 120 relative to second shaft 118.

The two openings 114 have compressed helical springs 136 therein that at all times tend to move second shaft end portions 116 upwardly therein. The two bodies 112 have tapped bores 138 therein that are axially aligned with openings 114. The tapped bores 138 are engaged by bolts 140.

By rotating the bolts 140 in an appropriate direction the springs 136 are further compressed, with the shaft end portions moving downwardly in openings 114. When the bolts are rotated in opposite directions the compressed springs 136 will move the shaft end portions 116 upwardly in the openings.

A tubular sleeve 142 is rotatably mounted on second shaft 118 and has a resilient wheel 144 secured to the outer surface thereof. Resilient wheel 144 frictionally engages idler roller 14 to be driven by the latter. The idler roller rotates due to first liner D engaging the lower portion thereof as shown in FIG. 6, prior to the first liner contacting the preheater roll B. A collar 146 is secured to second shaft 118 by a set screw 148. The collar 146 is in abutting contact with the right hand end of sleeve 142 as viewed in FIG. 5. The left hand end of sleeve 142 as viewed in FIG. 5 has a first sprocket 150 secured thereto.

First sprocket 150 engages an upwardly extending endless link belt 152. The link belt 152 is in engagement with a second sprocket 154 that is secured to the free end of a stub shaft 156 that is rotatably supported from reservoir 120.

A third shaft 158 is rotatably supported in reservoir 124 parallel to second shaft 118. Third shaft 158 has a glue applicator wheel 160 mounted thereon. A portion of glue applicator wheel 160 projects outwardly through a slot 162 formed in end piece 122.

A pair of resilient strips 164 are secured to the interior surface of end piece 122 by screws 166 or the like as shown in FIG. 5. The strips are in frictional pressure contact with opposite sides of applicator wheel 160 to prevent escape of glue G through slot 162.

Stub shaft 156 has a first gear 168 rigidly secured thereto. The first gear 168 is in toothed engagement with a second gear 170 secured to an end portion of third shaft 158 that projects from reservoir 120. A spacer 172 is mounted on second shaft 118 and is situated between first sprocket 158 and the right hand bracket 138 as viewed in FIG. 5. A second collar 148′ is mounted on second shaft 118 adjacent the left hand bracket ring 134 as viewed in FIG. 5. Collars 148 and 148′ serve as stops to maintain the glue reservoir 120 at a fixed longitudinal position relative to idler roller 14.

The bolts 110 and 140 when manually manipulated permit the second shaft 118 and the components supported thereon to be raised or lowered relative to idler roller 14 as well as pivoted towards or away from preheater roll B. In FIG. 6 one of the positions to which reservoir 120 may be pivoted is shown in phantom line.

The use and operation of the second form H of the invention is the same as the first form A and need not be repeated.

I claim:

1. In combination with a corrugator having a rotating preheater roll supported on a horizontal first shaft, a pair of arms pivotally supported from said first shaft and disposed on opposite sides of said roll, an idler roller rotatably supported between said arms and spaced from said roll, a first liner of less width than the length of said roll that extends under said idler roller and then upwardly to contact said preheater roll, said first liner having a first marginal edge portion, a second liner of less width than the length of said roll that contacts said roll above said idler roller, said second liner having a second marginal edge portion that overlies said first marginal edge portion and is subsequently brought into physical contact therewith on said corrugator, a device for applying a film of glue to said first marginal edge portion prior to the latter being contacted by said second marginal edge portion to provide a bonded liner of a desired width, said device including:

a. a second shaft that extends between said arms above said idler roller and is parallel to said first shaft;

b. first means for adjustably supporting said second shaft in a non-rotatable position from said arms;

c. a resilient wheel rotatably mounted on said second shaft that is in frictional engagement with said idler roller and is driven as said idler roller rotates;

d. a glue reservoir disposed above said second shaft, said reservoir having a first sidewall adjacent said roll in which a vertical slot is defined;

e. second means for supporting said reservoir from said second shaft;

f. a third shaft rotatably supported in said reservoir parallel to said second shaft;

g. a glue applicator wheel disposed in said reservoir and rigidly secured to said third shaft, said wheel of substantially the same width as that of said first marginal edge portion, said wheel having the lower portion thereof in contact with glue in said reservoir, and said wheel projecting outwardly through said slot to contact said first marginal edge portion; and h. third means for transferring rotational movement from said resilient wheel to said third shaft to drive said applicator wheel to apply a film of glue to said first marginal edge portion as said first and second liners move over said preheater roll to bond said first and second liners together to form said bonded liner.

2. A device as defined in claim 1 in which said second shaft has a longitudinal spline therein and said second means includes:

i. a pair of supports mounted on said arms, said supports having elongate openings therein in which end portions of said second shaft are slidably disposed, said supports having tapped bores therein in the portions thereof most remote from said arms;

j. a pair of compressed springs in said openings that at all times tend to move said second shaft away from said pair of arms;

k. a pair of bolts that engage said tapped bores and extend into said openings; and l. a pair of pins that extend from the ends of said bolts in said openings, said pins engaging said spline to prevent rotation of said second shaft relative to said supports, and said shafts being moved towards said pair of arms when said bolts are rotated in an appropriate direction.

3. A device as defined in claim 1 in which said reservoir includes a pair of parallel end pieces and said second shaft has a longitudinal spline therein, and said second means includes:

i. a pair of plates secured to said pair of end pieces;

j. a pair of rings secured to said plates that slidably engage said second shaft; and k. a pair of lugs secured to said rings, said lugs engaging said spline to prevent said reservoir rotating relative to said second shaft.

4. A device as defined in claim 1 in which said third means includes:

i. a first gear secured to said resilient wheel and rotating concurrently therewith; and j. a second gear secured to said third shaft and in toothed engagement with said first gear.

5. A device as defined in claim 1 which in addition includes:

i. resilient means supported from said side piece that sealingly engage opposite sides of said applicator wheel to prevent glue leaking from said reservoir.

* * * * *